June 28, 1955 D. E. ARNOLD 2,712,063
ELECTRONIC INDICATOR SYSTEM
Filed Feb. 16, 1950
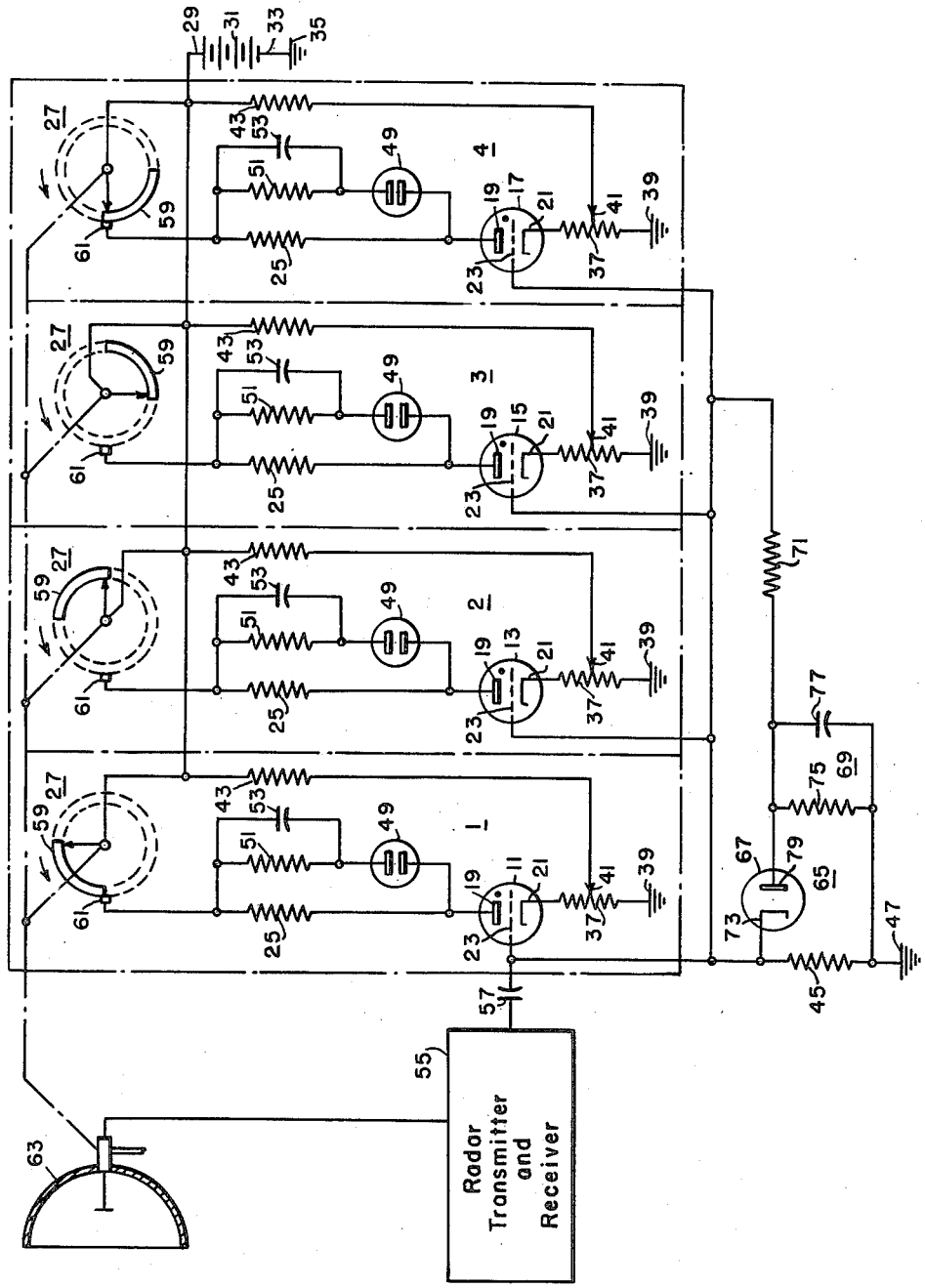
WITNESSES:
INVENTOR
David E. Arnold.
BY
ATTORNEY United States Patent Office 2,712,063
Patented June 28, 1955

2,712,063

ELECTRONIC INDICATOR SYSTEM

David E. Arnold, Glen Burnie, Md., assignor to Westinghouse Electric Corporation, East Pittsburgh, Pa., a corporation of Pennsylvania Application February 16, 1950, Serial No. 144,500

4 Claims. (Cl. 250—20)

My invention relates to electrical apparatus and more particularly to electronic circuits associated with radar apparatus.

In conventional types of radar apparatus, the presence of an object to be detected is indicated by a "pip" on the screen of a cathode ray tube. In some instances, and particularly in the case of airborne radar apparatus, the operator may have duties other than that of ardar operator, and consequently may fail to note the presence of a target indication.

For example, a major portion of the attention of the pilot of a modern military fighter aircraft is demanded by the complex system of instruments and controls necessary to maintain proper flight. At the same time, failure on his part to see a momentary "pip" on the radar target presentation screen may be disastrous.

The need therefore arises for a radar system in which the presence of an object to be detected will be readily apparent to the operator and yet which will not require his constant undivided attention. It would also be advantageous to have a target indication system which would operate to indicate the approximate azimuthal location as well as the presence of the target.

On the other hand, it is desirable that the operator should not be distracted by false target indications. Such false indications, as is well known, are often caused by spurious triggering of the radar apparatus by the noise component of the received signal.

It is accordingly, an object of my invention to provide a reliable target indication system for use with radar apparatus.

It is another object of my invention to provide a system for use with radar apparatus, in which the presence of an object to be detected will be apparent to the operator, though he may be occupied with other duties.

Another object of my invention is to provide for use in conjunction with IFF equipment a dependable system which will afford an accurate indication of the azimuthal region in which a target appears.

It is another object of my invention to provide for use with radar receiving apparatus a reliable system which will indicate the quadrant location of objects from which a received radar impulse has been reflected.

An ancillary object of my invention is to provide means for use in conjunction with radar receiving apparatus for indicating the quadrant location of a target although the target is located near the boundary of a quadrant.

Another ancillary object of my invention is to provide a radar target azimuthal region location indication system which is not responsive to noise signals.

A further ancillary object of my invention is to provide in a radar target quadrant location indication system a means to prevent triggering of the said indication system by spurious signals such as noise.

In accordance with my invention, I provide a system for use with radar apparatus, in which the presence of an object to be detected is manifested by the energization of an indicator such as, for example, a lamp. In order that the operator may be instantly appraised of the approximate azimuthal location of the target, I provide a plurality of indicators, each of which is assigned to a particular range of azimuth. The energizing means for these indicators is synchronized with the radar scanning system so that only the indicator assigned to the azimuth range in which a target appears is actuated.

More specifically, the indicator means in the system of my invention may be connected in the anode circuit of a gaseous triode, which is triggered by a received signal. The anode circuit of a particular gaseous triode is closed by a contact means which is synchronized with the scanning means, only when the azimuth range assigned to the particular indicator means is being scanned.

I prevent false target indications caused by spurious signals by applying a negative bias to the triodes which is proportional in magnitude to the positive noise peaks. This may be done by rectifying the negative half of the noise component of the received signal, smoothing the rectifier output by means of a network having a long time constant, and applying the resultant voltage as a negative bias in the control circuits of the triodes.

The novel features which I consider characteristic of my invention are set forth with more particularity in the appended claims. The invention itself, however, together with additional advantages and objects thereof, will be best understood from the following description with reference to the drawing in which the single figure is a schematic diagram of a preferred embodiment of the invention.

In the system shown in the drawing, I have provided four identical indicator circuits which are designated generally at 1, 2, 3 and 4, each of which is assigned to a quadrant of azimuth. Each of these indicator circuits includes an electric discharge device 11, 13, 15 and 17, respectively, which may be a gaseous triode of the thyratron type having an anode 19, a cathode 21 and a control element 23. The anode of each thyratron is connected through a dropping resistance 25 and a switch 27 to be hereinafter more fully described to the positive terminal 29 of a suitable plate voltage supply 31, the negative terminal 33 of which is grounded at 35. The cathode of each thyratron is connected through a potentiometer 37 to ground at 39. Cathode bias is obtained by a connection from the movable element 41 of the potentiometer 37 through a suitable dropping resistance 43 to the positive terminal of the plate voltage supply 31. The control elements 23 of the thyratrons are connected through a bias resistor 45 to ground at 47. An indicator device, which is illustrated as a neon bulb 49, is connected in series with a current limiting resistor 51 across the anode voltage dropping resistor 25. A capacitor 53 is connected in parallel with this current limiting resistor for a purpose to be hereinafter more fully described.

The output of a radar receiver which is shown in the drawing as included in a block 55 is coupled through a capacitor 57 to the grids 23 of the thyratrons 11, 13, 15 and 17, respectively.

The anode circuit switches 27 mentioned above have a rotatable segmental contact 59 and a stationary brush 61. The contact segments are of such a length as to conduct over about 95° of azimuth. Segments of successive switches are arranged so as to start conducting 90° later than the segment immediately preceding. There is about a 5° overlap in the conducting of successive segments. The anode circuit switches are mechanically connected so as to rotate in synchronism with the radar transmitter antenna scanning means 63.

A noise compensation circuit designated generally at 65 includes a diode detector 67, a smoothing network, and a bias resistor 71. The cathode 73 of the diode detector 67 is connected to the control elements 23 of the triodes 11, 13, 15 and 17, respectively. The smoothing network comprises a parallel resistor 75, capacitor 77 combination, one side of which is connected to the detector anode 79, the other side being connected to ground at 47. The bias resistor 71 is connected in parallel with the diode detector 67.

For the purpose of describing the operation of my system, assume that an object to be detected appears in the first quadrant to which the first indicator circuit is assigned. An echo pulse will then appear at the radar receiver output which is coupled by a capacitor 57 to the control elements 23 of the triodes 11, 13, 15 and 17, respectively. This positive echo pulse is of such magnitude as to overcome the negative bias on the control elements on the thyratrons so that they will conduct if their anode circuits are closed. However, the segmental switches 27 are in such position that only the anode circuit of the thyratron 11 assigned to the first quadrant will be closed. Conduction of the triode 11 in the first quadrant will cause a voltage drop across the dropping resistor 25 which is connected in series with its anode. Consequently, a voltage will appear across the corresponding neon bulb causing it to give a light indication. By this indication the operator is immediately appraised of the presence of a target in the first quadrant. The operator may now assume manual control of the radar apparatus and track the target accurately by use of the cathode ray tube presentation screen and its associated controls.

Now assume that the object to be detected had appeared very near the end of the first quadrant. In this case the current limiting resistance 25 would prevent sufficient current from passing through the corresponding neon bulb to give an adequate indication. But by virtue of the fact that a capacitor 53 is connected in parallel with the current limiting resistance 51, a relatively high current will flow through the neon bulb immediately, and thus an adequate indication is obtained. The operation of the system when targets appear in other quadrants is readily apparent.

As is well known, the output signal of a radar receiver will contain spurious signals such as noise in addition to the desired positive echo pulse. Such spurious signals may cause false triggering of the indicating apparatus. To eliminate this difficulty, I have provided a noise compensation circuit which has been described above. To understand the operation of this circuit, it should be noted that the desired radar echo pulse is always positive while the noise signal is an alternating parameter. Consequently, the diode detector 67 is connected so as to rectify the negative portion of the radar receiver output signal. This rectified parameter is passed through the smoothing network 69 so that a voltage proportional to the positive noise peaks is obtained. This voltage is applied in the grid circuits of the triodes 11, 13, 15 and 17 as an additional negative bias. By this means the effect of the noise component of the received signal is neutralized.

I realize that many modifications of my system are possible without departing from the scope of my invention. For example, means for obtaining audible indicating signals having a separate frequency for each scanning region could be substituted for the visual means illustrated in the drawing. It is further apparent that any number of scanning regions could be employed so as to give the desired degree of approximation of the target location.

Although I have shown and described a specific embodiment of my system, I do not wish to be limited other than by the spirit of the invention and the disclosures of the prior art.

I claim as my invention:

1. In a receiving system in which the received signal comprises spaced pulse energy of one polarity plus undesired noise energy, an electric discharge device having an anode, a cathode, and a control element, means for applying said received signal to said control element, a rectifying device having its cathode connected directly to said control element for rectifying the portion of said received signal of opposite polarity to said pulse signal, a network having a long time constant for smoothing said rectified signal, and means for applying the resultant rectified signal to produce a bias on the said control element, whereby said electric discharge device is not triggered by the noise component of the received signal.

2. In a signal receiving system for a source of spaced pulse signals of one polarity, apparatus for eliminating undesired noise energy occurring during the time between desired pulse signals and comprising an electron valve having a control element included therein, means for applying said signals directly to said control element, a rectifying device having its cathode directly coupled to said signal source for rectifying the portion of said noise energy having a polarity opposite to that of said pulse signals, and means for applying the rectified output of said device to said control element as a bias voltage.

3. The combination claimed in claim 2 and including means for averaging the rectified output of said device.

4. In a signal receiving system for a source of spaced pulse signals of one polarity, apparatus for eliminating undesired noise energy occurring during the time between desired pulse signals and comprising an electron valve having a control element included therein, means for applying said signals directly to said control element, a rectifying device having its cathode directly coupled to said signal source for rectifying the portion of said noise energy having a polarity opposite to that of said pulse signals, means comprising a network having a long time constant for averaging the rectified output of said device, and means for applying said averaged signal as a bias to said control element.

References Cited in the file of this patent

UNITED STATES PATENTS

| Number | Name | Date |
| --- | --- | --- |
| 2,293,835 | Landon | Aug. 25, 1942 |
| 2,301,649 | Thompson | Nov. 10, 1942 |
| 2,329,570 | Wellenstein | Sept. 14, 1943 |
| 2,345,762 | Martinelli | Apr. 4, 1944 |
| 2,404,626 | Tyler | July 23, 1946 |
| 2,415,566 | Rhea | Feb. 11, 1947 |
| 2,428,011 | Chatterjea | Sept. 30, 1947 |
| 2,454,415 | Tourshou | Nov. 23, 1948 |
| 2,471,888 | Newbold | May 31, 1949 |
| 2,490,025 | Bryan | Dec. 6, 1949 |
| 2,493,446 | Crosby | Jan. 3, 1950 |
| 2,512,637 | Frazier | June 27, 1950 |
| 2,582,135 | Kleis et al. | Jan. 8, 1952 |